Figure 1:
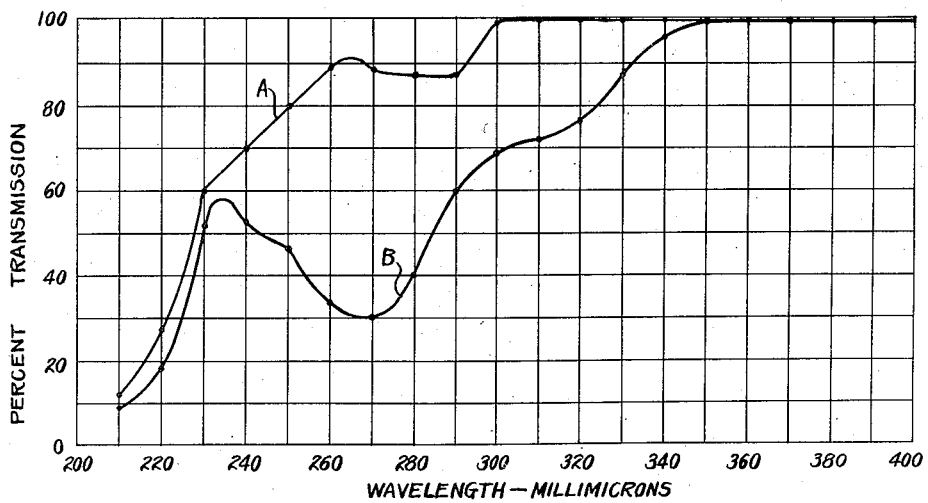

Dec. 16, 1958        L. CHALKLEY        2,864,752

PHOTOSENSITIVE COMPOUNDS

Filed June 6, 1957

ABSORPTION SPECTRA OF:—
A – PATENT BLUE V CYANIDE AT $p^H 4$   5mg IN 50ml; DILUTED 1:10
B – PATENT BLUE V CYANIDE AT $p^H 9$   5mg IN 50ml; DILUTED 1:10

ABSORPTION SPECTRUM OF FAST ACID VIOLET 10B CYANIDE
AT $p^H 7$   5mg IN 50ml

INVENTOR.
Lyman Chalkley
BY
Bacon & Thomas
ATTORNEYS

United States Patent Office 2,864,752
Patented Dec. 16, 1958

2,864,752

PHOTOSENSITIVE COMPOUNDS

Lyman Chalkley, Prince Georges County, Md.

Application June 6, 1957, Serial No. 664,113

18 Claims. (Cl. 204—158)

The present invention relates to hydrophilic dye cyanides and, more particularly, to colorless hydrophilic cyanides of triphenylmethane dyes having at least one amino group para to the central methane carbon atom and a sulfonic acid group on a phenyl nucleus ortho to the point of attachment of the phenyl group to the central methane carbon atom.

It has long been known that certain of the triphenylmethane dyes which contain at least one amino group para to the central methane carbon atom form colorless, or nearly colorless, cyanides which in the presence of suitable organic activators become photosensitive to ultraviolet and shorter wave lengths of light to produce colored compounds but which are not sensitive to light in the visible range. Because of this property, the substances may be used in solution and absorbed or coated on a suitable base in the presence of an activator for the recording and measurement of ultraviolet radiation. Expensive equipment, such as quartz spectrographs and photoelectric meters, are ordinarily used to isolate this region.

Papers prepared from one of the photosensitive compounds and an activator therefor may be used in photographic and photo-duplication processes to print out images that are fully formed without development, that may be permanent, and that may be examined in ordinary interior illumination without fixing. The papers employed retain their ultraviolet sensitivity after the printing of one image so that other portions may be printed on at a later date.

However, all of the previously known p-amino triphenylmethane dye cyanides have been hydrohobic in nature and are not activated by water so as to be photosensitive to ultraviolet and shorter wave lengths.

I have found that new compounds which comprise p-amino triphenylmethane dye cyanides having in the molecule at least one hydrophilic group, such as sulfonic acid, quaternary ammonium or hydroxyl groups, are hydrophilic in character and that the potential sensitivity to ultraviolet radiation possessed by the known hydrophobic dye cyanides is not lost in the new compounds. In fact, unlike the previous hydrophobic p-amino triphenylacetonitriles, the new compounds are activated by water, alone. It will be understood, of course, that more than one type of hydrophilic group may be present in the same molecule of dye cyanide. The p-amino groups may be primary, secondary, or tertiary in nature.

Also, most of the p-amino triphenylmethane dye cyanides, including those which contain hydrophilic groups and are photoactivated by water, do not yield permanent colors on undergoing photohydrolysis when subjected to ultraviolet light if relatively high pH conditions are present. This is presumably because the dyes formed undergo hydrolysis to the carbinol form of the dye which is colorless.

For example, the diamino-triphenylacetonitriles, such as malachite green cyanide and brilliant green cyanide do not give stable colors above pH 6, rapidly undergoing the phototropic reaction. The triamino triphenylacetonitrile dyes are stable under somewhat higher pH conditions, pH 8, for example, but any appreciably more basic conditions will cause even these dyes to be subject to the phototropic reaction.

Accordingly, it is an object of the present invention to provide new p-amino triphenylacetonitriles having at least one amino group para to the central methane carbon atom which are hydrophilic and are activated by water to form colored compounds on exposure to ultraviolet and shorter wave lengths.

Another object of the present invention is to provide new p-amino triphenylacetonitriles which are photosensitive to ultraviolet and shorter wave lengths to yield permanent colors under strongly basic conditions.

Still another object of the present invention is to provide a photochemical process employing the new dye cyanides.

Figure 2:
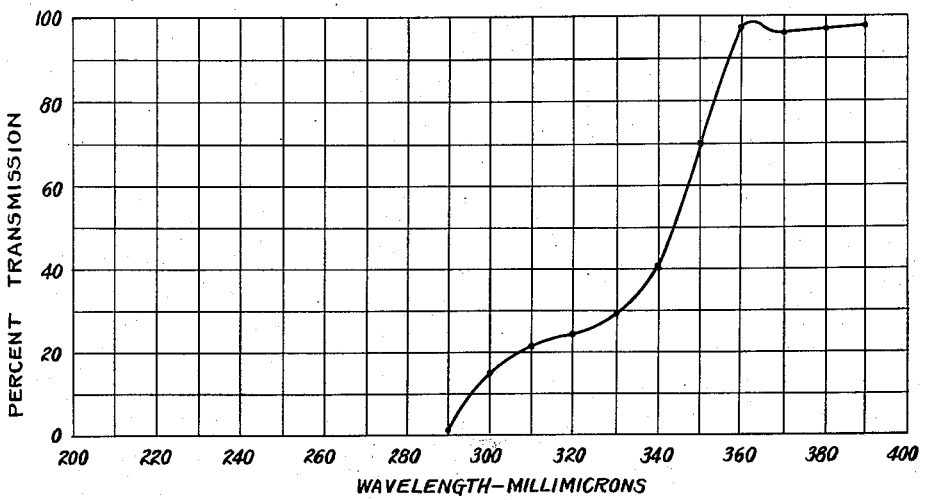

The present invention will now be described in detail in conjunction with the drawings, in which:

Fig. 1 is a graph showing the ultraviolet absorption spectra of patent blue V cyanide at pH 4 and pH 9; and Fig. 2 is a graph showing the ultraviolet absorption spectrum of fast acid violet 10B cyanide at pH 7.

It has been found that the cyanides of a group of sulfonated p-amino triphenylmethane dyes often referred to as the patent blue type are photosensitive under pH conditions as high as 10 or 11 to yield permanent, deeply colored compounds. All of the dyes of this unique class are characterized chemically by a sulfonic acid group ortho to the central methane carbon atom.

Cyanides have been prepared of the following patent blue type dyes: Xylene blue VS, xylene blue AS, patent blue V, erioglaucine, fast acid violet 10B, food, drug and cosmetic green No. 3 and xylene cyanol FF. They have all exhibited the ability, upon ultraviolet irradiation, to form permanently colored compounds under basic conditions, as mentioned above, but otherwise they have proved to be remarkably variable in their photochemical behavior. All undergo more or less of the familiar photohydrolysis of the cyano group to reform the parent dye, but some, at least, also undergo a much more profound photochemical decomposition with production, in part, of new dyes. Also, the quantum yield of dye appears to vary considerably among the dye cyanides of this type. Therefore, these cyanides will be considered individually hereinafter.

The sulfonic acid group of the new dye cyanides may exist in the free acid form or it may be combined with cations other than hydrogen. The sulfonic acid group is, itself, a highly ionized salt-forming radical. The essential part of the group, for the purpose of photoactivation, is the sulfonic in $RSO_3^-$. This ion, because of its strongly hydrophilic character, confers the desired hydrophilic property upon the p-amino-triphenylacetonitrile to which it is attached. However, the ion alone does not constitute a complete neutral molecule and, therefore, the sulfonic ion is always combined with an ion of opposite charge in a complete molecule. Thus, the sulfonic ion is combined with a cation which may be hydrogen or a metallic ion, or ammonium. Of course, when the cation is hydrogen, the acid may further combine to form a salt of an amino group within the molecule, itself.

The nature of the cation with which the sulfonic ion is combined is not at all critical in the new compounds of this invention. In aqueous solution in which these triphenyl-acetonitriles are photosensitive, the sulfonic group is largely ionized and the cation is no longer even a part of the molecule under the conditions in which the dye cyanides are utilized to take advantage of their photochemical properties. Therefore, any cation may be used with the sulfonic acid group to prepare a satisfactory hydrophilic dye cyanide.

For matters of convenience, selected ions are combined with these groups in the examples to be given later. In general, the principal considerations here relate to solubility. For example, many of the free sulfonic acids, such as that of xylene blue AS cyanide, are so insoluble that if recrystallization techniques are employed for their purification, inordinately large quantities of solvent are necessary, whereas the alkali metal salts have the limited solubility necessary for efficient recrystallization. On the other hand, the free sulfonic acid form of erioglaucine cyanide is so soluble that it is impracticable to crystallize from solution, whereas the potassium or strontium salts have the desired limited solubility.

However, regardless of the cation present, the dye cyanides are all photosensitive when properly activated and may be employed in photosensitive preparations.

One suitable compound of the present invention, particularly useful in actinometry because of the range of sensitivity available and the stable blue color which is obtained, is the disulfonated aminotriphenylmethane dye cyanide having the general formula

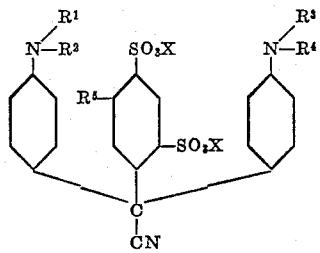

where $R^1$, $R^2$, $R^3$ and $R^4$ are each an alkyl group, such as methyl or ethyl, or an aralkyl group, such as benzyl, $R^5$ is a hydrogen atom or a hydroxyl group and X is a cation.

This formula includes, of the dye cyanides mentioned earlier, the cyanide of xylene blue VS, Colour Index No. 672, the cyanide of xylene blue AS, Colour Index No. 673, and the cyanide of patent blue V, Colour Index No. 712. It will be understood that each compound includes both the free sulfonic acid and salts thereof.

The compound may conveniently be prepared by the action of an alkali cyanide on an acid dye, as shown in the examples given below. The preparations described in these examples should be carried out by yellow light, such as the illumination of a Kodak OA safelight.

EXAMPLE 1.—XYLENE BLUE VS CYANIDE

To a solution of 25 g. of commercial xylene blue VS, Colour Index 672, in 150 ml. of water is added 4.5 g. of 95% sodium cyanide and the mixture is heated for one hour in a pressure bottle placed in a boiling water bath. Suitable precautions should be taken to avoid cuts by glass wet with sodium cyanide solution in the event of the explosion of the bottle. The solution is then cooled, allowed to stand for one day at 25° C. and filtered from the precipitated xylene blue VS cyanide disodium salt having the formula

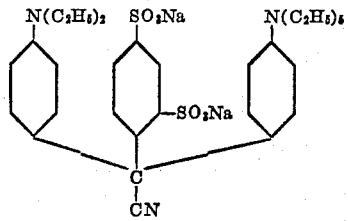

The disodium salt is readily soluble in water to yield a colorless solution that slowly becomes blue on exposure to radiation of wave length 2537 A. The color change is much slower than with a solution of a representative basic dye cyanide, such as malachite green cyanide, in alcohol and, thus is useful in actinometry of more intense radiation.

The free acid form of xylene blue VS cyanide having the formula

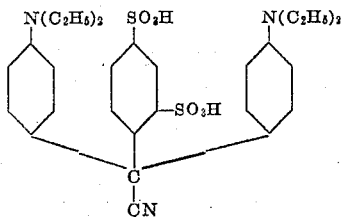

may be prepared by treatment of a solution of 11 g. of the disodium salt in 100 ml. of water with 11.2 ml. of concentrated hydrochloric acid. After the mixture has stood at room temperature for two days, the colorless precipitated free acid is collected on a filter, washed with water and air dried. It is sparingly soluble in water. A dilute, colorless, aqueous solution of the free acid colors blue on ultraviolet irradiation at a speed intermediate between that of the solutions of the sodium salt and of alcoholic solutions of malachite green cyanide.

The barium salt of xylene blue VS cyanide having the formula

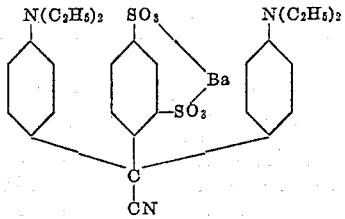

may be prepared by neutralization of a hot ½ of 1% aqueous solution of the free acid to pH 8.4 with N/10 barium hydroxide solution. The neutralized solution is cooled to room temperature, allowed to stand for three days, and filtered from the colorless, crystalline barium salt. The barium salt is less soluble in water than the free acid, but quite sufficiently soluble to give photosensitive solutions that behave, on exposure to ultraviolet, like solutions of the sodium salt.

On irradiation in acid solution, two dyes were formed, the parent xylene blue VS and a new labile dye with red absorption band that bleached in alkaline solution. In neutral solution only the parent dye, xylene blue VS, was formed on irradiation. Perhaps the other dye also was formed, but decomposed in the neutral solution as fast as formed.

EXAMPLE 2.—XYLENE BLUE AS CYANIDE

A solution of 25 g. of xylene blue AS, Colour Index No. 673, in 150 ml. of water at 85° C. is treated in a pressure bottle with 9 g. of 95% sodium cyanide, the pressure bottle immediately sealed and heated in a boiling water bath for one hour. The bottle is then cooled, allowed to stand over night at 25° C. and the precipitated, colorless disodium salt of the dye cyanide having the formula

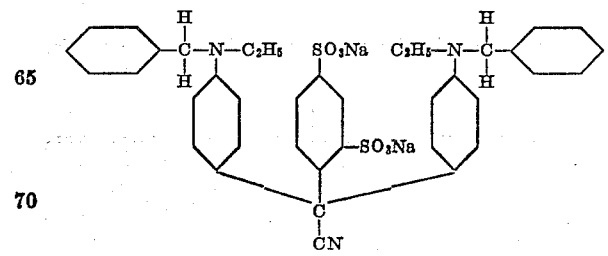

is collected on a filter and air dried. This salt is readily soluble in water to give colorless solutions that color slowly when exposed to ultraviolet.

The free acid form of the dye cyanide having the formula

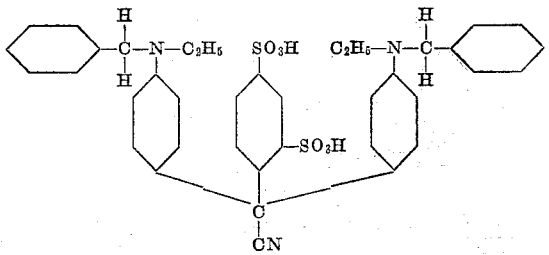

may be prepared by treatment of a solution of 15 g. of the disodium salt in 400 ml. of water with 22.5 ml. of 2 N hydrochloric acid. After standing for seven days at room temperature the precipitated free acid is collected on a filter, washed with water and air dried. The colorless crystals are sparingly soluble in water to give a solution that colors on ultraviolet irradiation somewhat more rapidly than solutions of the disodium salt.

The barium salt, having the formula

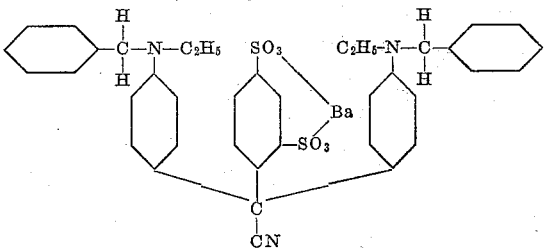

is readily prepared by neutralization of a boiling solution of the free acid in 1,000 times its weight of water with N/10 barium hydroxide to pH 8.0. The colorless, crystalline barium salt is little soluble in water, but sufficiently soluble to give a photosensitive solution with properties similar to that of the disodium salt.

In acid solution both the parent dye, xylene blue AS, and a new dye with a blue-violet absorption band were formed.

Because of the low quantum yield of the photosensitive system of this dye cyanide in water and in hydrophilic colloids, as was the case with xylene blue VS cyanide, it is useful in actinometry requiring long exposures, such as fading tests on dyed materials, where a measure of the ultraviolet component is desired.

EXAMPLE 3.—PATENT BLUE V CYANIDE

To a solution of 5 g. of patent blue V, Colour Index No. 712 of 35% dye content, in 75 ml. of water is added 2 g. of 95% sodium cyanide, and the mixture heated in a pressure bottle in a boiling water bath for one hour. The solution is then cooled to 25° C., filtered from a trace of tar and saturated with carbon dioxide to produce the disodium salt having the formula

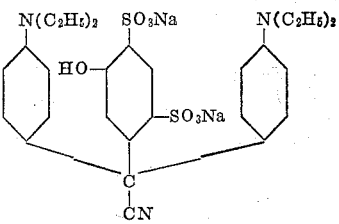

from the trisodium salt having the formula

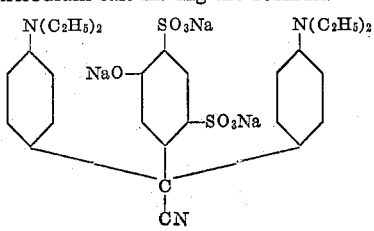

When the solution has been saturated at 25° C. and atmospheric pressure with carbon dioxide, it is treated with 40 ml. of a 49% aqueous solution of sodium acetate trihydrate, allowed to stand for three days and the disodium salt collected on a filter and washed with 91% isopropyl alcohol (25 ml.) and air dried.

The salt forms colorless solutions in water that slowly become blue on exposure to ultraviolet. The salt may be converted into the free acid having the formula

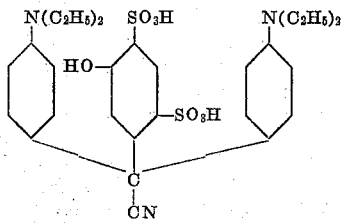

and other salts as with the xylene blue cyanides described in Examples 1 and 2.

In a neutral aqueous solution of its disodium salt, or in a gelatin film, patent blue V cyanide prints out an image in the color of the parent dye. Under these conditions the cyanide is sensitive not only to the wave lengths effective with the basic dye cyanides, but also to considerably longer wave lengths, in fact to 3650 A. In acid solution in water, patent blue V cyanide is no longer appreciably sensitive to sunlight, but is converted into the dye by wave lengths shorter than about 3000 A.

A more quantitative description of these characteristics is given by Table 1, below:

*Table 1*

COLOR FORMATION IN PATENT BLUE V CYANIDE SOLUTIONS ON EXPOSURE AT VARYING ACIDITY

| Acidity, pH | Formed Color | Comparative Rate of Color Formation On Exposure to 2537 A | Sensitivity to Sunlight (Winter) |
|---|---|---|---|
| 9.0 | Blue | fast | + + |
| 8.2 | do | a little slower | + + |
| 7.2 | do | slow | |
| 6.5 | do | do | |
| 5.8 | do | fast | + |
| 4.6 | do | fastest | — |
| 3.8 | do | do | — |
| 3.5 | Slightly Greenish Blue | fast | — |

It will be seen that the long wave length range sensitivity was greatest above pH 8.2 and had reached its maximum by pH 9.0. For the short wave length range sensitivity was greatest at pH 3.5 to 4.6. The optimum was about pH 4.0. Below pH 3.6 the hue of the dye formed became greener and more degraded, which probably accounted for the apparent loss of speed at pH 3.5. Above pH 4.6 the system became increasingly sensitive to longer wave lengths and the absolute sensitivity fell until the pH was above 7, when it rose again.

It should be noted that between the optimum acidity conditions for the short wave length and long wave length ranges there is a region of acidity from about pH 4.6 to 8.2 in which the absolute sensitivity fell even for exposure to 2537 A., which is absorbed and readily effective in bringing about the photochemical reaction in both acid and alkaline solutions. Apparently, in this intermediate acidity range the dye cyanide is in some state that is less photosensitive than under conditions where the amino groups are free (pH 9) or converted into salt (pH 4).

In the above work the comparative rate of color formation on exposure to 2537 A. and sensitivity to sunlight were judged visually and were not precise. However, the differences were great enough to make visual distinction easy. In the sunlight column the designation (+) means that something over one-half hour was required to produce a deep coloration and (++) means that this condition was achieved in five to ten minutes. The most acid solutions were not absolutely insensitive to sunlight, but three-hour exposure to bright midday sun produced a negligible color and this situation is indicated as (—) in the table.

The observed results are borne out by the ultraviolet absorption spectra of patent blue V cyanide at pH 4 and pH 9 as shown by Fig. 1. At pH 4, there is negligible absorption at 3000 A., whereas at pH 9, patent blue V cyanide continues to absorb up to 3500 A. or higher.

The long wave length range is readily achieved in solution by using the disodium salt of the dye cyanide in water. The solution needs no other component, though the use of a borax or phosphate pH 9 buffer contributes to constancy of sensitivity. Coated materials may be made from the disodium salt of the dye cyanide in a hydrophilic colloid, such as polyvinyl alcohol or gelatin. Gelatin is especially useful because of its buffering effect. Solutions having short wave range of sensitivity are readily prepared by dissolving the disodium salt of the cyanide in dilute aqueous acetic acid, or by use of a phosphate or acetate buffer at about pH 4.

Although the other four new dye cyanides mentioned earlier, the cyanides of Colour Index No. 696, fast acid violet 10B, and Color Index No. 671, erioglaucine, food, drug and cosmetic green No. 3 and xylene cyanol FF do not come within the structural formula which was given for the other three dye cyanides, mentioned earlier, all have a sulfonic acid group ortho to the central methane carbon atom and are photosensitive in much more basic media than are p-amino triphenylmethane dye cyanides which do not have such a group. These last-mentioned dye cyanides have at least one sulfonic acid group in addition to the ortho-positioned sulfonic acid group, and this may be a substituent of the phenyl radical of a benzyl group attached to an amino nitrogen atom. These cyanides may be prepared as follows:

EXAMPLE 4.—FAST ACID VIOLET 10B CYANIDE

A solution of 25 g. of commercial fast acid violet 10B in the form of Kiton Fast Violet 10B (manufactured by the Ciba Co.) in 150 ml. of water heated to 90° C. is placed in a glass pressure bottle. In this commercial form, the dye is apparently present as the magnesium salt, presumably being so precipitated to take advantage of its limited water solubility. Considerable amounts of crystalline sodium sulfate are also present. To the bottle is added a solution of 2 g. of 95% sodium cyanide in 10 ml. of water. The bottle is sealed and heated at 100° C. for three hours. It is transferred to a dark place, allowed to cool and to stand at 25° C. for 24 hours. The bottle is then opened, the precipitate collected on a filter and dried without washing. This precipitate is partly disodium salt having the formula

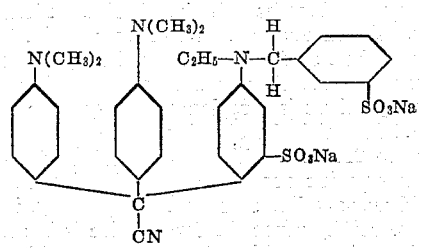

but also contains the magnesium salt of the dye cyanide in admixture therewith because of the fact that the parent dye was present in the form of its magnesuim salt. It is soluble in water to form a solution that colors violet on exposure to radiation of wave lengths shorter than about 3250 A.

The free acid having the formula

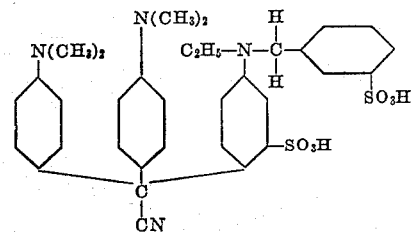

is obtained by treating a solution of 5 g. of the mixed magnesium and disodium salts in 70 ml. of water at 50° C. with 6.5 ml. of 2 N hydrochloric acid. The resulting solution is allowed to stand in the dark at room temperature for four days, the precipitate collected on a filter, washed with 20 ml. of cold water, and dried in the dark. The free acid so obtained is stable in the light and is pure enough for most purposes. To obtain it analytically pure it should be recrystallized from 500 times its weight of water. An aqueous solution of the free acid is colored violet by exposure to wave lengths shorter than about 3650 A.

This cyanide also has a short wave length range and a long wave length range of sensitivity separated from each other by a difference in acidity.

Fig. 2 shows the ultraviolet absorption spectrum of fast acid violet 10B cyanide in aqueous solution at pH 7. It will be seen that there is substantial absorption at wavelengths as long as 3500 A. Gelatin films can be sensitized with fast acid violet 10B cyanide so as to have an exceptionally high sensitivity as compared with other dye cyanide sensitized materials in the spectral range of 3300 to 3500 A. These materials print most rapidly from continuous ultraviolet sources, such as sunlight and the carbon arc.

EXAMPLE 5.—ERIOGLAUCINE CYANIDE

Twenty-five g. of Kiton Pure Blue L (manufactured by the Ciba Company) is put in a pressure bottle with 150 ml. of boiling water. The dye dissolves immediately. The solution is cooled to 80° C. and a solution of 3.4 g. of 95% sodium cyanide in 10 ml. of water is added, the bottle sealed immediately and heated for one hour at 100° C.

After heating, the bottle is cooled to room temperature, opened, and the solution filtered from a trace of impurity, treated in a good hood with 6.5 ml. of concentrated hydrochloric acid and evaporated in vacuo at about 50° C. to a volume of 60 ml. The acidity of the somewhat viscous solution is adjusted with sodium hydroxide to pH 6.8. A solution of 22 g. of potassium chloride in 75 ml. of boiling water is then added and the resulting solution allowed to stand in the dark for a week with occasional stirring and scraping of the vessel walls to accelerate the very slow crystallization of the potassium salt which has the formula

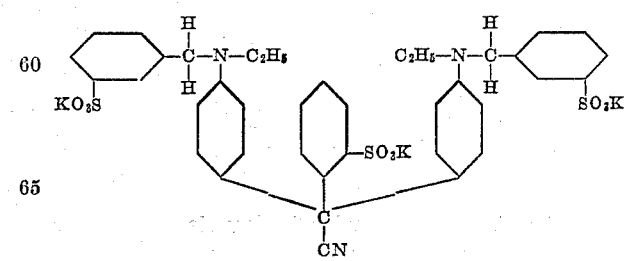

The precipitate is collected on a filter, washed with 25 ml. of aqueous 10% potassium chloride solution, sucked as dry as possible on the filter and dried in vacuo over sulfuric acid. The yield is about 15 g. of nearly colorless material. A second crop, though containing more dye, may be obtained by the addition of 22 g. more of potassium chloride to the mother liquor.

The potassium salt is very soluble in water to form a photosensitive solution that turns blue on exposure to ultraviolet.

A less soluble salt that can be recrystallized from water without the necessity of salting out may be made by treatment of a solution of 15 g. of the potassium salt in 100 ml. of water with 26 ml. of molar strontium chloride solution and allowing the solution to stand for one month with occasional stirring and scratching of the walls of the vessel. The precipitate is then collected and dried in a vacuum desiccator over sulfuric acid. It has the approximate composition represented by the formula

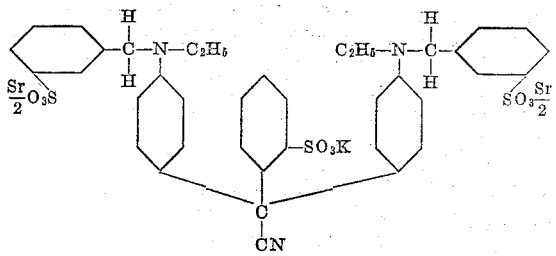

It may be recrystallized from 15 times its weight of water.

The image produced by ultraviolet irradiation of erioglaucine cyanide sensitized materials is highly suited for the cyan print in three-color separation photography.

EXAMPLE 6.—FOOD, DRUG AND COSMETIC GREEN NO. 3 CYANIDE

Twenty-five grams of food, drug and cosmetic green No. 3, assaying 87% dye, is dissolved in 125 ml. of boiling water and the solution filtered and placed in a pressure bottle. To the dye solution is added a solution of 5.5 g. of 97% sodium cyanide in 10 ml. of water. The pressure bottle is closed and heated at 100° C. for 2½ hours, and allowed to cool. To the resulting cold reaction solution is added in a good hood 8 ml. of concentrated hydrochloric acid to produce an acid reaction, and the solution then boiled until hydrogen cyanide has been expelled—about ½ hour. To the boiled and cooled solution 50% sodium hydroxide solution is added to a reaction of pH 8.5, and then is added a solution of 22 g. of strontium chloride hexahydrate in 25 ml. of boiling water. The mixture is allowed to cool and to stand at room temperature for 5 days. The precipitate that has formed is then collected on a filter, washed with 50 ml. of ice water, and dried at 110° C. to yield about 12 grams of the dye cyanide having the formula

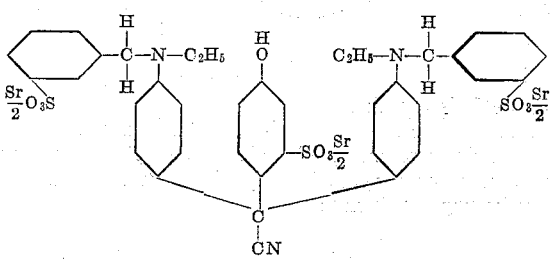

The substance may be further purified by recrystallization from water, although the recrystallization is slow unless the product is salted out by a soluble strontium salt. The compound forms a solution in water that is strongly photosensitive turning green on exposure to ultraviolet.

It will be noticed that the colors formed from the previously mentioned dye cyanides are either violet or blue, the blue being, in fact, a cyan rather than a pure blue but nevertheless blue. A rich pure green is a rarity among dyes of this type, the only one now in use being the present food, drug and cosmetic green No. 3, and the cyanide of this dye provides a printing material that gives a rich pure green image on irradiation with ultraviolet.

EXAMPLE 7—XYLENE CYANOL FF CYANIDE

A solution of 25 g. of xylene cyanol FF (a commercial dye related to Colour Index No. 715 manufactured in Switzerland and sold in the United States by the Eastman Kodak Company) in 125 ml. of boiling water is filtered through a steam-heated funnel. The filtrate is put in a pressure bottle with a solution of 7.2 g. of 97% sodium cyanide in 20 ml. of water, and the closed bottle heated at 100° C. for 5 hours, and allowed to cool to room temperature. The cool solution is acidified with hydrochloric acid, the hydrogen cyanide boiled off in a good hood, and the reaction adjusted with sodium hydroxide to pH 9. This solution is then evaporated to dryness, the solid residue extracted with five times its weight of dimethyl formamide and the extract treated with ten times its volume of ethyl acetate and allowed to stand for 24 hours at room temperature. A heavy thick liquid is precipitated which consists of some dimethyl formamide and xylene cyanol FF cyanide in the form of its sodium salt, which has the formula

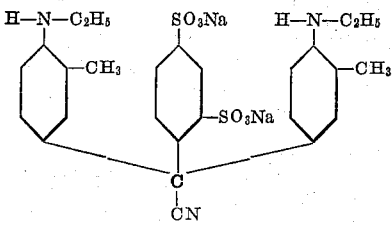

To obtain the solid dye cyanide the ethyl acetate solution is decanted from the heavier thick liquid, and the latter is vacuum evaporated to remove dimethyl formamide. However, the liquid form as precipitated by ethyl acetate is quite satisfactory for making photosensitive preparations without the more laborious step of the vacuum evaporation. The liquid form is extremely soluble in water to provide a photosensitive solution, and the solution may also be used to sensitize paper and other hydrocolloids.

The images produced by the use of xylene cyanol FF cyanide sensitized materials differ from those of other cyanides described here, in that the hue produced upon irradiation with ultraviolet in the acid and mild alkaline range, approximately pH 4 to pH 8, is a pure blue and not the cyan of the xylene and patent blues. This is not available from any of the other cyanides in a class of dye cyanides having a sulfonic acid group positioned ortho to the central methane carbon atom.

All of the hydrophilic dye cyanides disclosed herein form photosensitive combinations with hydrocolloids, as set forth in my application, Serial No. 542,479, filed October 24, 1955, now Patent No. 2,855,303, which issued October 7, 1958.

The present application is a continuation-in-part of my copending application, Serial No. 550,773, now abandoned, which is a continuation-in-part of my application, Serial No. 494,270, now abandoned.

I claim:
1. A hydrophilic cyanide of a p-amino triphenylmethane dye containing a sulfonic acid group ortho to the central methane carbon atom on one of the phenyl groups attached thereto, said cyanide forming a colored compound when exposed in the presence of water to ultraviolet and shorter wave lengths.
2. The hydrophilic dye cyanide having the formula

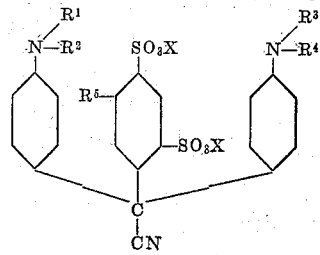

where $R^1$, $R^2$, $R^3$ and $R^4$ are each selected from the group consisting of methyl, ethyl and benzyl groups, $R^5$ is selected from the group consisting of a hydrogen atom and a hydroxyl group and X is a cation.

3. The hydrophilic dye cyanide having the formula

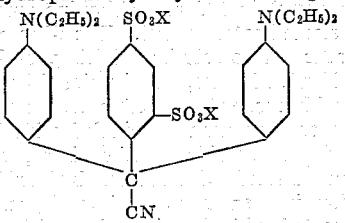

where X is a cation.

4. The hydrophilic dye cyanide having the formula

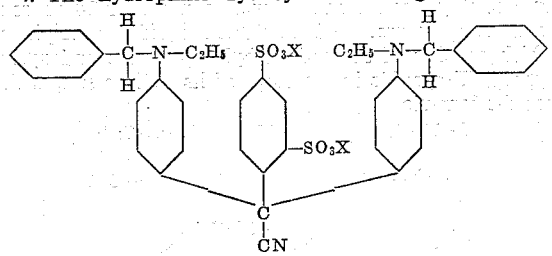

where X is a cation.

5. The hydrophilic dye cyanide having the formula

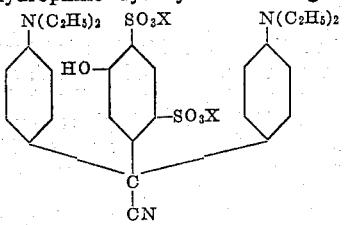

where X is a cation.

6. The hydrophilic dye cyanide having the formula

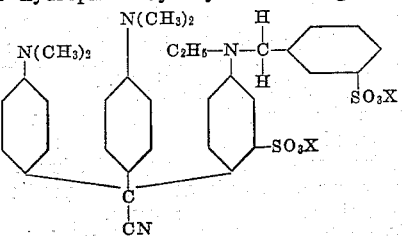

where X is a cation.

7. The hydrophilic dye cyanide having the formula

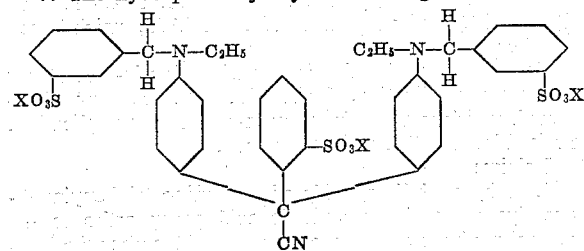

where X is a cation.

8. The hydrophilic dye cyanide having the formula

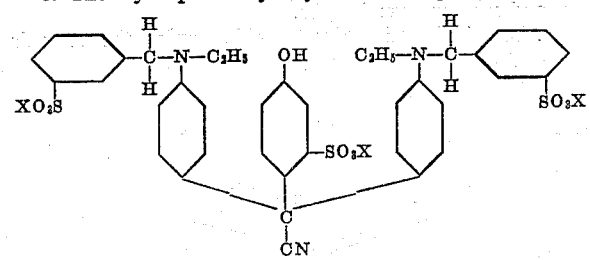

where X is a cation.

9. The hydrophilic dye cyanide having the formula

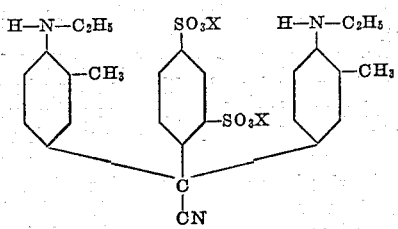

where X is a cation.

10. A process for forming a stable dye compound comprising irradiating with ultraviolet light in the presence of water, a hydrophilic cyanide of a p-amino triphenylmethane dye containing a sulfonic acid group ortho to the central methane carbon atom on one of the phenyl groups attached thereto.

11. A process for forming a stable dye compound comprising irradiating with ultraviolet light in the presence of water, a hydrophilic cyanide of a triphenylmethane dye having the formula

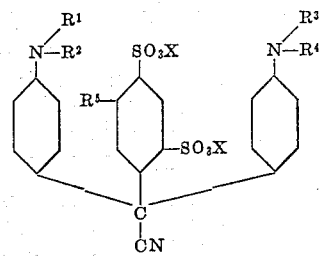

where $R^1$, $R^2$, $R^3$ and $R^4$ are each selected from the group consisting of methyl, ethyl and benzyl groups, $R^5$ is selected from the group consisting of a hydrogen atom and a hydroxyl group and X is a cation.

12. A process for forming a stable dye compound comprising irradiating with ultraviolet light in the presence of water, a hydrophilic cyanide of a triphenylmethane dye having the formula

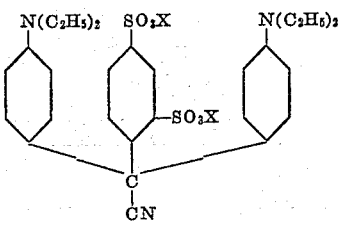

where X is a cation.

13. A process for forming a stable dye compound comprising irradiating with ultraviolet light in the presence of water, a hydrophilic cyanide of triphenylmethane dye having the formula

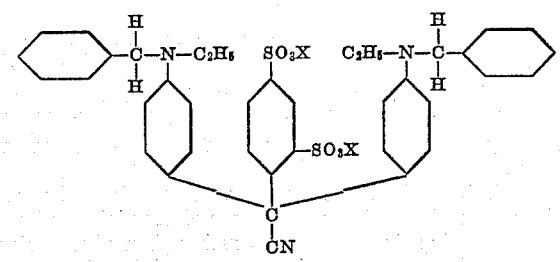

where X is a cation.

14. A process for forming a stable dye compound comprising irradiating with ultraviolet light in the presence of water, a hydrophilic cyanide of triphenylmethane dye having the formula

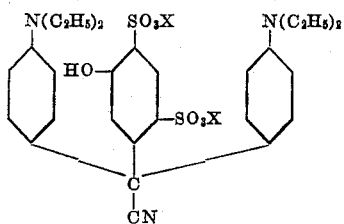

where X is a cation.

15. A process for forming a stable dye compound comprising irradiating with ultraviolet light in the presence of water, a hydrophilic cyanide of triphenylmethane dye having the formula

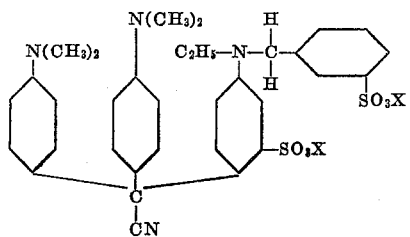

where X is a cation.

16. A process for forming a stable dye compound comprising irradiating with ultraviolet light in the presence of water, a hydrophilic cyanide of triphenylmethane dye having the formula

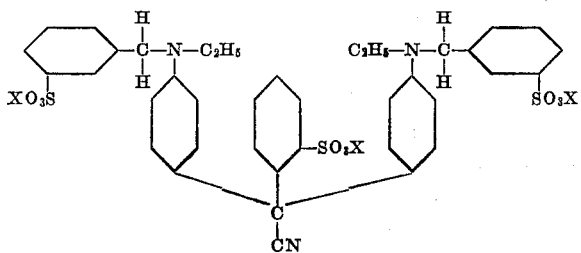

where X is a cation.

17. A process for forming a stable dye compound comprising irradiating with ultraviolet light in the presence of water, a hydrophilic cyanide of triphenylmethane dye having the formula

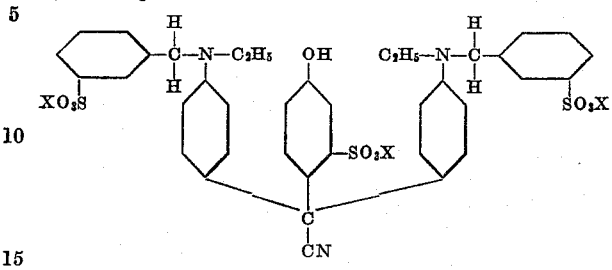

where X is a cation.

18. A process for forming a stable dye compound comprising irradiation with ultraviolet light in the presence of water, a hydrophilic cyanide of triphenylmethane dye having the formula

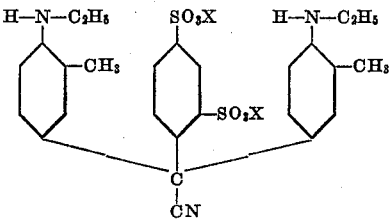

where X is a cation.

References Cited in the file of this patent

UNITED STATES PATENTS

| | | |
|---|---|---|
| 2,150,695 | Muehler | Mar. 14, 1939 |
| 2,325,038 | Chalkley | July 27, 1943 |
| 2,441,561 | Chalkley | May 18, 1948 |
| 2,469,682 | Dickey | May 10, 1949 |
| 2,732,337 | Togel | Jan. 24, 1956 |
| 2,734,027 | Nickerson | Feb. 7, 1956 |

FOREIGN PATENTS

| | | |
|---|---|---|
| 324,966 | Great Britain | Feb. 10, 1930 |